(12) United States Patent
Hapsari et al.

(10) Patent No.: US 8,208,928 B2
(45) Date of Patent: Jun. 26, 2012

(54) MOBILE COMMUNICATION METHOD AND MOBILE STATION

(75) Inventors: Wuri Andarmawanti Hapsari, Yokosuka (JP); Mikio Iwamura, Yokohama (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/989,063

(22) PCT Filed: Jun. 19, 2009

(86) PCT No.: PCT/JP2009/061227
§ 371 (c)(1),
(2), (4) Date: Jan. 5, 2011

(87) PCT Pub. No.: WO2009/154277
PCT Pub. Date: Dec. 23, 2009

(65) Prior Publication Data
US 2011/0105124 A1    May 5, 2011

(30) Foreign Application Priority Data
Jun. 20, 2008    (JP) .................. 2008-162617

(51) Int. Cl.
*H04W 36/00*    (2009.01)
(52) U.S. Cl. .......................... 455/438; 380/44; 713/171
(58) Field of Classification Search ............. 455/436, 455/438; 370/338
See application file for complete search history.

(56) References Cited

U.S. PATENT DOCUMENTS

| | | | |
|---|---|---|---|
| 6,771,776 B1 * | 8/2004 | Rose | 380/272 |
| 7,231,046 B1 | 6/2007 | Einola et al. | |
| 2008/0137853 A1 | 6/2008 | Mizikovsky et al. | |
| 2008/0267405 A1 * | 10/2008 | Vialen et al. | 380/270 |
| 2008/0267407 A1 * | 10/2008 | Vanderveen | 380/277 |

FOREIGN PATENT DOCUMENTS

| | | |
|---|---|---|
| JP | 2007-194848 A | 8/2007 |
| JP | 2007-267120 A | 10/2007 |
| JP | 2008-72694 A | 3/2008 |

OTHER PUBLICATIONS

Japanese Office Action mailed Oct. 20, 2009; Reference No. 2008P00152; Japanese Patent Application Serial No. 2008-162617 with English translation (5 pages).
International Search Report w/translation from PCT/JP2009/061227 dated Jul. 21, 2009 (4 pages).
Written Opinion from PCT/JP2009/061227 dated Jul. 21, 2009 (4 pages).

(Continued)

*Primary Examiner* — Marcos Batista
(74) *Attorney, Agent, or Firm* — Osha Liang LLP

(57) ABSTRACT

The present invention relates to a mobile communication method in which a mobile station performs a handover from a handover source radio base station to a handover target radio base station. The mobile communication method includes the steps of: (A) acquiring, at the handover target radio base station, from the handover source radio base station or a switching center, a key for calculating a first key for generating a certain key used in a communication between the handover target radio base station and the mobile station; and (B) acquiring, at the handover target radio base station, from the switching center, a second key for calculating a first key for generating a certain key used in a communication between a next handover target radio base station and the mobile station.

17 Claims, 11 Drawing Sheets

OTHER PUBLICATIONS

3GPP TS 33.401 V8.0.0; "3rd Generation Partnership Project; Technical Specification Group Services and System Aspects; 3GPP System Architecture Evolution (SAE): Security Architecture"; Jun. 2008 (45 pages).

Extended European Search Report for Application No. 09766725.7 dated Oct. 15, 2011 (8 pages).

3GPP TSG SA WG3 Security-SA3#50 ; S3-080107 "Key Refresh at Intra-MME Handovers" San Ya, China, Feb. 25-29, 2008 (3 pages).

Extended European Search Report for Application No. 11180873.9 dated Oct. 6, 2011 (8 pages).

Office Action for Australian Application No. 2009261130 dated Oct. 17, 2011 (3 pages).

3GPP TSG WG3 Security-S3#51; S3-080735, "CR-33401: KeNB Forward Security Simplification" 8.0.0, Vancouver, Canada, Apr. 14-18, 2008 (9 pages).

Office Action for Australian Application No. 2011226982 dated Nov. 25, 2011 (3 pages).

* cited by examiner

MOBILE COMMUNICATION METHOD AND MOBILE STATION

TECHNICAL FIELD

The present invention relates to a mobile communication method for communicating between a mobile station and a radio base station using a certain key.

BACKGROUND ART

A conventional mobile communication system of the LTE (Long Term Evolution) scheme specified by the 3GPP is configured to communicate between a mobile station UE and a radio base station eNB, by using a certain key.

The certain key includes, for example, a key $K_{RRC\_Ciph}$ used for "Ciphering" in an RRC protocol, which is a C-plane protocol between the mobile station UE and the radio base station eNB (Access Stratum, AS), a key $K_{RRC\_IP}$ used for "Integrity Protection" in the RRC protocol, and a key $K_{UP\_Ciph}$ used for "Ciphering" in a U-plane protocol between the mobile station UE and the radio base station eNB (Access Stratum, AS) and the like. These certain keys are generated using a first key $K_{eNB}$.

Using the same key as any of the certain keys and the first key $K_{eNB}$ for a long time is not preferable, because it makes the system's security vulnerable. For this reason, a procedure for updating such a certain key or a first key $K_{eNB}$ during handover is devised by the 3GPP.

Here, operations of a handover target radio base station (Target eNB) acquiring a first key $K_{eNB}^{**}$ used for generating a certain key in the handover procedure of the mobile station UE are described referring to FIG. 12.

As shown in FIG. 12, first, a handover source radio base station (Source eNB) generates an intermediate key $K_{eNB}^{*}$ based on a stored first key $K_{eNB}$, a parameter "Next Hop", a parameter "Handover Type" representing the parameter type and a parameter "Target PCI" representing the identification information of a handover target cell.

Secondly, the handover source radio base station (Source eNB) transmits the generated intermediate key $K_{eNB}^{*}$ to the handover target radio base station (Target eNB).

Thirdly, the handover target radio base station (Target eNB) generates, based on the received intermediate key $K_{eNB}^{*}$ and "C-RNTI (Cell Radio Network Temporary ID)" allocated by the handover target cell, a first key $K_{eNB}^{**}$ used for generating a certain key in the handover target radio station (Target eNB).

DISCLOSURE OF THE INVENTION

Problem to be Solved by the Invention

However, as described above, in the handover procedure of the conventional mobile communication system, there is a problem that both handover source radio base station (Source eNB) and handover target radio base station (Target eNB) have to use a plurality of parameters and functions to generate a first key $K_{eNB}^{**}$ used in the handover target radio station (Target eNB).

In particular, there is a problem that the handover source radio base station (Source eNB) and the handover target radio base station (Target eNB) have to use $K_{eNB}$ conversion functions (Key Derivation Function, KDF) different in parameters for each of the stations, and the mobile station UE also has be provided with the KDFs, whereby the procedure is complicated.

Furthermore, it is cumbersome that $K_{eNB}$ needs to be updated according to PCI (Physical Cell ID) of the handover target radio base station.

Furthermore, there is a restriction in flexibly changing the allocation of C-RNTI, since $K_{eNB}$ needs to be updated according to C-RNTI.

Accordingly, the present invention has been made in view of the above-described problems, and an object of the present invention is to provide a mobile communication method with which a first key used in a handover target radio base station (Target eNB) can be generated through a simplified procedure.

Solution to Problem

A first aspect of the present invention is summarized as a mobile communication method in which a mobile station performs a handover from a handover source radio base station to a handover target radio base station, the mobile communication method including the steps of: (A) acquiring, at the handover target radio base station, from the handover source radio base station or a switching center, a key for calculating a first key for generating a certain key used in a communication between the handover target radio base station and the mobile station; and (B) acquiring, at the handover target radio base station, from the switching center, a second key for calculating a first key for generating a certain key used in a communication between a next handover target radio base station and the mobile station.

In the first aspect, the mobile communication method can further include the step of: (C) updating, at the mobile station, upon receiving a handover command signal from the handover source radio base station, a first key for generating a certain key used in a communication between the handover source radio base station and the mobile station, to the first key for generating the certain key used in the communication between the handover target radio base station and the mobile station.

In the first aspect, in the step (C), the mobile station can update the first key for generating the certain key used in the communication between the handover source radio base station and the mobile station, to the first key for generating the certain key used in the communication between the handover target radio base station and the mobile station, based on a parameter included in the handover command signal.

In the first aspect, the step (C) can include the steps of: (C1) generating, at the mobile station, the first key for generating the certain key used in the communication between the handover target radio base station and the mobile station based on the parameter included in the handover command signal, when the parameter is incremented; and (C2) generating, at the mobile station, the first key for generating the certain key used in the communication between the handover target radio base station and the mobile station based on the first key for generating the certain key used in the communication between the handover source radio base station and the mobile station, when the parameter included in the handover command signal is not incremented.

In the first aspect, in the step (C1), when the parameter included in the handover command signal is incremented, the mobile station can update, based on the parameter, a second key for calculating the first key for generating the certain key used in the communication between the handover target radio base station and the mobile station, and can generate the first key for generating the certain key used in the communication between the handover target radio base station and the mobile station based on the updated second key.

In the first aspect, the parameter can be KI.

In the first aspect, the mobile communication method can further include the step of: (D) storing, at the mobile station, the received parameter.

A second aspect of the present invention is summarized as a radio base station which functions as a handover target radio base station when a mobile station performs a handover from a handover source radio base station to the handover target radio base station, the radio base station including: a first acquiring unit configured to acquire, from the handover source radio base station, a key for calculating a first key for generating a certain key used in a communication between the handover target radio base and the mobile station; and a second acquiring unit configured to acquire, from a switching center, a second key for calculating a first key for generating a certain key used in a communication between a next handover target radio base station and the mobile station.

A third aspect of the present invention is summarized as a mobile station which performs a handover from a handover source radio base station to a handover target radio base station, the mobile station including: a key updating unit configured to update, upon receiving a handover command signal from the handover source radio base station, a first key for generating a certain key used in a communication between the handover source radio base station and the mobile station, to a first key for generating a certain key used in a communication between the handover target radio base station and the mobile station.

In the third aspect, the key updating unit can be configured to update, based on a parameter included in the handover command signal, the first key for generating the certain key used in the communication between the handover source radio base station and the mobile station, to the first key for generating the certain key used in the communication between the handover target radio base and the mobile station.

In the third aspect, the key updating unit can be configured to generate, when the parameter included in the handover command signal is incremented, the first key for generating the certain key used in the communication between the handover target radio base station and the mobile station, based on the parameter; and the key updating unit can be configured to generate, when the parameter included in the handover command signal is not incremented, the first key for generating the certain key used in the communication between the handover target radio base station and the mobile station, based on the first key for generating the certain key used in the communication between the handover source radio base station and the mobile station.

In the third aspect, the key updating unit can be configured to update, when a parameter included in the handover command signal is incremented, a second key for calculating the first key for generating the certain key used in the communication between the handover target radio base station and the mobile station, based on the parameter, and to generate the first key for generating certain keys used in the communication between the handover target radio base station and the mobile station, based on the updated second key.

In the third aspect, the parameter can be KI.

In the third aspect, the key updating unit can be configured to store the received parameter.

Effect of the Invention

As described above, according to the present invention, it is possible to provide a mobile communication method with which a first key used in a handover target radio base station (Target eNB) can be generated through a simplified procedure.

BEST MODES FOR CARRYING OUT THE INVENTION (Mobile Communication System According to First Embodiment of the Present Invention)

A mobile communication system according to a first embodiment of the present invention is described referring to FIG. 1 to FIG. 6.

The mobile communication system according to this embodiment is a mobile communication system to which the LTE scheme is applied, and includes a plurality of switching centers MME#1, MME#2, . . . and a plurality of radio base stations eNB#11, eNB#12, eNB#21, eNB#22, . . . .

For example, a mobile station UE is configured to communicate, in the cell #111 under the control of the radio base station eNB#11, with the radio base station eNB#11 using a certain key described above.

Furthermore, in the handover procedure of the mobile station UE, the handover target radio base station (for example, the radio base station eNB#12) is configured to acquire first keys $K_{eNB}[n+1]$, $K_{eNB}[n+2]$ and the like for generating certain keys used in a communication with the mobile station UE, without using an intermediate key $K_{eNB}*$ generated by the handover source radio base station (for example, the radio base station eNB#11).

Figure 1:
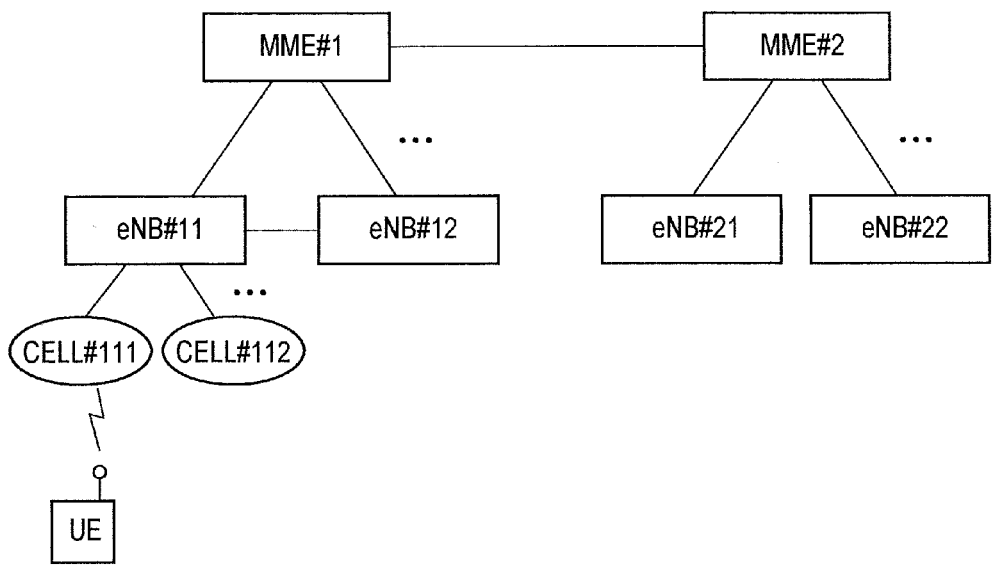
FIG. 1 is an overall configurational view of a mobile communication system according to a first embodiment of the present invention.
Figure 2:
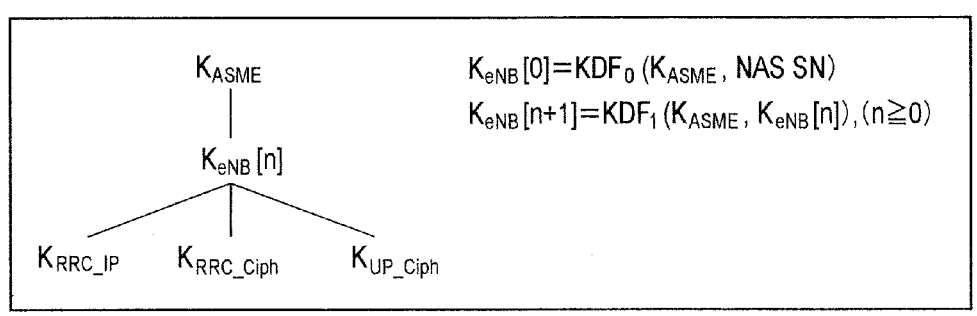
FIG. 2 is a diagram showing an example of a hierarchical structure and a calculation procedure of a key used in the mobile communication system according to the first embodiment of the present invention.

FIG. 2 shows an example of the hierarchical structure and the calculation procedure of a key used in the mobile communication system according to this embodiment (that is, a key used to calculate the certain key).

As shown in FIG. 2, a key $K_{RRC\_IP}$ used for "Integrity Protection" in the RRC protocol, a key $K_{RRC\_Ciph}$ used for "Ciphering" in the RRC protocol, and a key $K_{UP\_Ciph}$ used for "Ciphering" in the U-plane of AS are generated using a first key $K_{eNB}$ [n].

The first key $K_{eNB}$ [n] is calculated by using a master key $K_{ASME}$ from the formulas given below.

$$K_{eNB}[0]=KDF_0(K_{ASME}, NAS\ SN)$$

$$K_{eNB}[n+1]=KDF_1(K_{ASME}, K_{eNB}[n]), (n \geq 0)$$

Here, the master key $K_{ASME}$ is known only to the mobile station UE and the switching center MME, but must not be known to the radio base station eNB.

Furthermore, the NAS SN is a sequence number (SN) of a NAS protocol which is the C-plane protocol between the mobile station UE and the switching center MME (Non Access Stratum, NAS).

Hereafter, operations of the mobile communication system according to this embodiment are described referring to FIG. 3 to FIG. 6.

Figure 3:
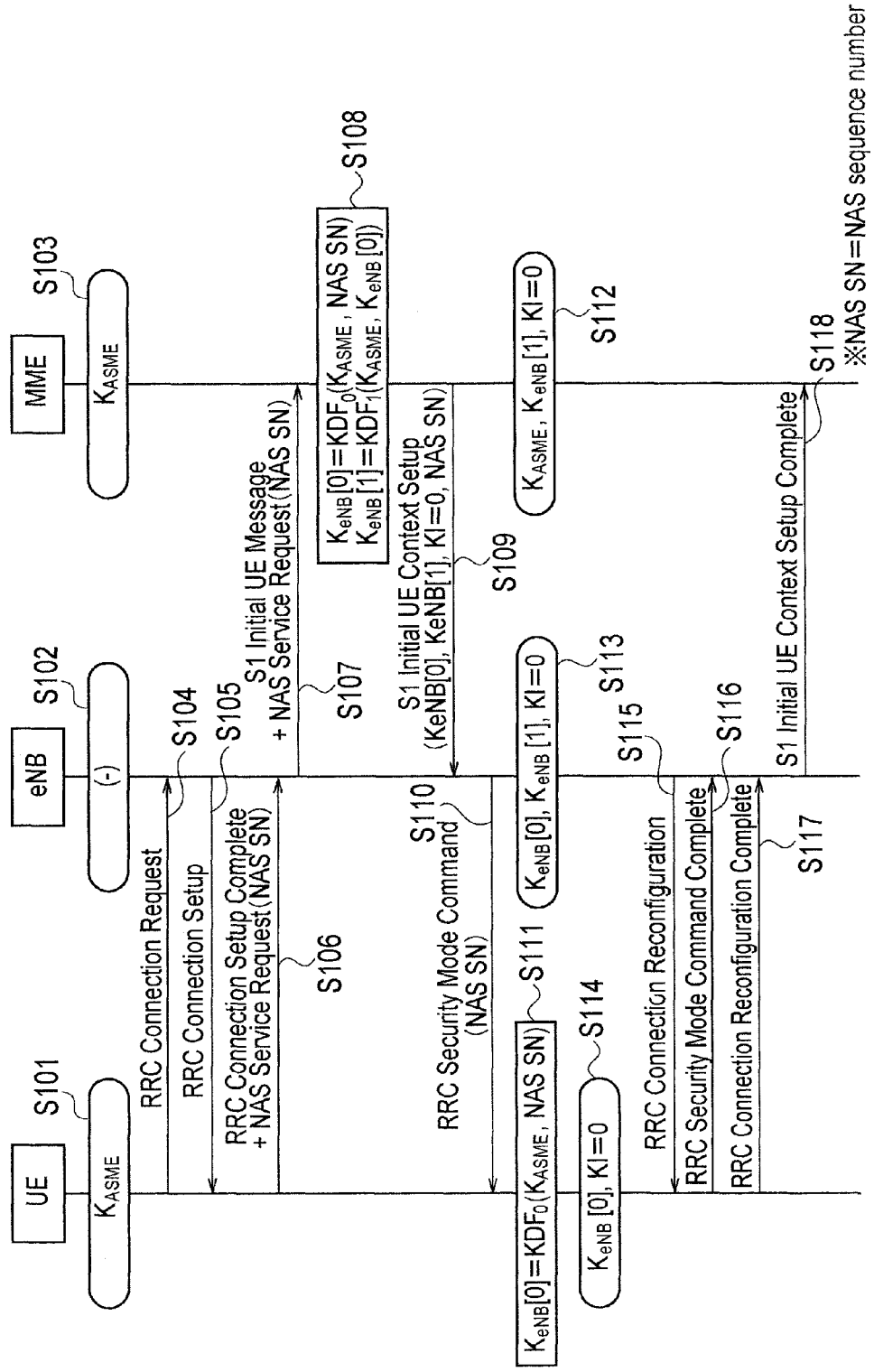
FIG. 3 is a sequence diagram showing an initial establishment procedure in the mobile communication system according to the first embodiment of the present invention.

First, an initial establishment procedure in the mobile communication system according to this embodiment is described referring to FIG. 3.

As shown in FIG. 3, before starting the initial establishment procedure, the mobile station UE holds $K_{ASME}$ (in step S101), the radio base station eNB holds no keys used for generating certain keys (in step S102), and the switching center MME holds $K_{ASME}$ (in step S103).

In step S104, the mobile station UE transmits "RRC Connection Request (RRC connection request signal)" to the radio base station eNB, and in step S105, the radio base station eNB transmits "RRC Connection Setup (RRC connection setup signal)" to the mobile station UE.

In step S106, the mobile station UE transmits "RRC Connection Setup Complete (RRC connection setup complete signal)" to the radio base station eNB and "NAS Service Request (NAS service request signal)" including "NAS SN (sequence number of NAS)".

In step S107, the radio base station eNB transmits "S1 Initial UE Message" and "NAS Service Request (NAS service request signal)" including "NAS SN" to the switching center MME.

In step S108, the switching center MME calculates $K_{eNB}$ [0] and $K_{eNB}$ [1] from the formulas given below.

$$K_{eNB}[0]=KDF_0(K_{ASME}, NAS\ SN)$$

$$K_{eNB}[1]=KDF_1(K_{ASME}, K_{eNB}[0])$$

In step S109, the switching center MME transmits "S1 Initial UE Context Setup (initial UE context setup signal)" including $K_{eNB}$ [0], $K_{eNB}$ [1] and "NAS SN" to the radio Base station eNB. Furthermore, "KI (=0)" may or may not be included in this message.

In step S110, the radio base station eNB transmits "RRC Security Mode Command (RRC security mode command signal)" including "NAS SN" to the mobile station UE.

In step S111, the mobile station UE calculates $K_{eNB}$ [0] from the formula given below.

$$K_{eNB}[0]=KDF_0(K_{ASME}, NAS\ SN)$$

Furthermore, the mobile station UE calculates $K_{RRC\_IP}$, $K_{RRC\_Ciph}$ and $K_{UP\_Ciph}$ based on $K_{eNB}$ [0], and uses them in subsequent AS communications.

In this stage, the mobile station UE holds $K_{eNB}$ [0], and "KI (=0)" (in step S114), the radio base station eNB holds $K_{eNB}$ [0], $K_{eNB}$ [1] and "KI (=0)" (in step S113), and the switching center MME holds $K_{ASME}$, $K_{eNB}$ [1] and "KI (=0)" (in step S112).

If "KI (=0)" is not included in the "S1 Initial UE Context Setup (initial UE context setup signal)" in step S109, the radio base station eNB may initialize "KI (=0)" automatically by receiving the above message.

Furthermore, the radio base station eNB calculates $K_{RRC\_IP}$, $K_{RRC\_Ciph}$ and $K_{UP\_Ciph}$ based on $K_{eNB}$ [0], and uses them in subsequent AS communications.

In step S115, the radio base station eNB transmits "RRC Connection Reconfiguration (RRC connection reconfiguration signal)" to the mobile station UE.

In steps S116 and S117, the mobile station UE respectively transmits "RRC Security Mode Command Complete (RRC security mode command complete signal)" and "RRC Connection Reconfiguration Complete (RRC connection reconfiguration complete signal)" to the radio base station eNB.

In step S118, the radio base station eNB transmits "S1 Initial UE Context Setup Complete (initial UE context setup complete signal)" to the switching center MME.

Through the above procedure, all keys necessary for protection of AS communication (integrity protection and ciphering) are prepared at the mobile station UE, the radio base station eNB and the switching center MME.

Figure 4:
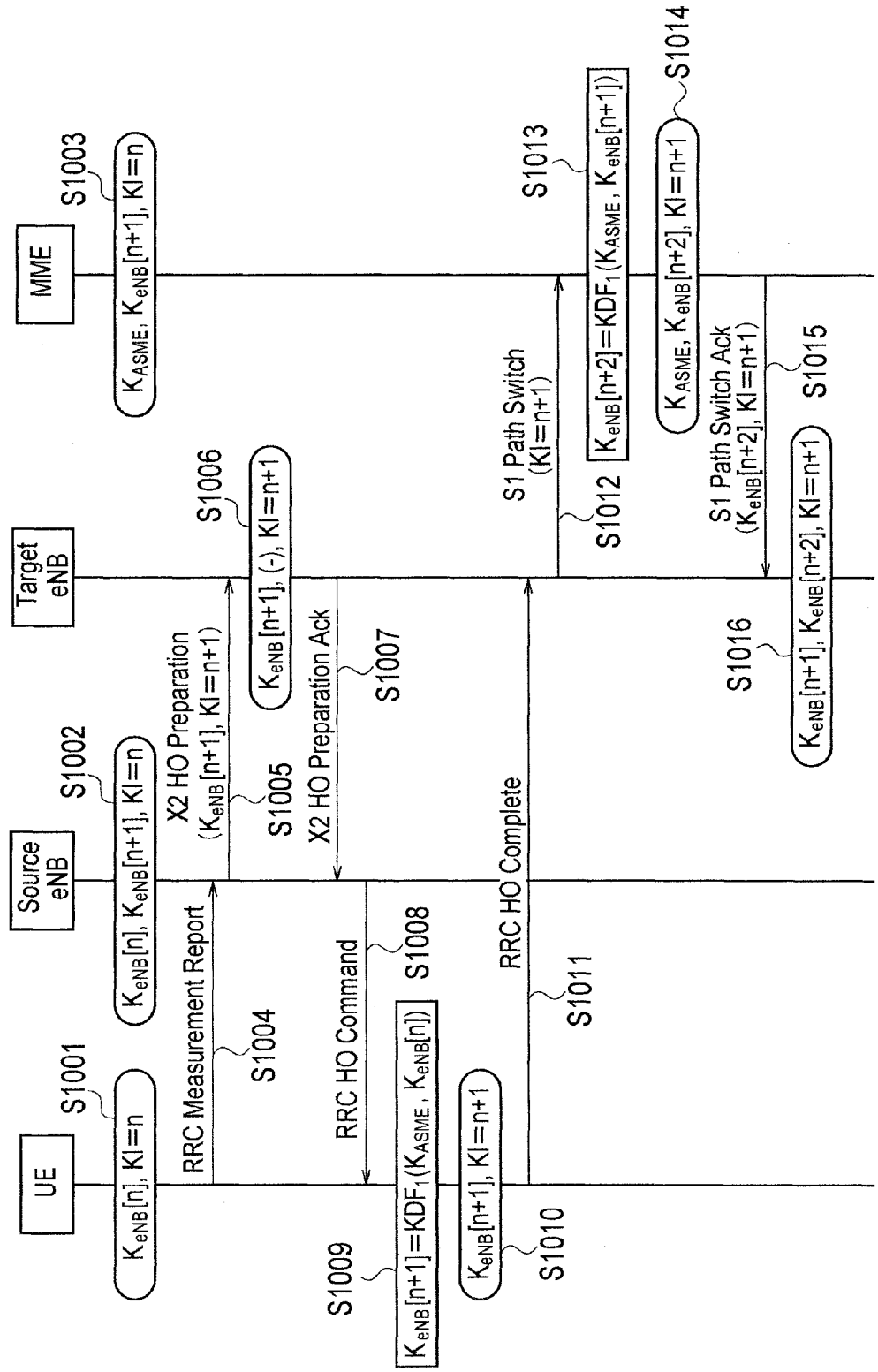
FIG. 4 is a sequence diagram showing an X2 handover procedure in the mobile communication system according to the first embodiment of the present invention.

Secondly, an X2 handover procedure (handover procedure between different radio base stations) in the mobile communication system according to this embodiment is described referring to FIG. 4.

As shown in FIG. 4, before starting the X2 handover procedure, the mobile station UE holds $K_{eNB}$ [n] and "KI (=n)" (in step S1001), the handover source radio base station (Source eNB) holds $K_{eNB}$ [n], $K_{eNB}$ [n+1] and "KI (=n)" (in step S1002), and the switching center MME holds $K_{ASME}$, $K_{eNB}$ [n+1] and "KI (=n)" (in step S1003).

In step S1004, if predetermined conditions are satisfied, the mobile station UE transmits "RRC Measurement Report (measurement report signal)" to the handover source radio base station (Source eNB).

In step S1005, the handover source radio base station (Source eNB) transmits "X2 HO Preparation (handover preparation signal)" including $K_{eNB}$ [n+1] and "KI (=n+1)" to the handover target radio base station (Target eNB).

In step S1006, the handover target radio base station (Target eNB) stores the received $K_{eNB}$ [n+1] and "KI (=n+1)", and in step S1007, transmits "X2 HO Preparation Ack (handover preparation acknowledge signal)" to the handover source radio base station (Source eNB).

Furthermore, the radio base station eNB calculates $K_{RRC\_IP}$ $K_{RRC\_Ciph}$ and $K_{UP\_Ciph}$ based on $K_{eNB}$ [n+1] and uses them in subsequent AS communications.

In step S1008, the handover source radio base station (Source eNB) transmits "RRC HO Command (handover command signal)" to the mobile station UE.

In step S1009, the mobile station UE calculates $K_{eNB}$ [n+1] from the formula given below, and in step S1010, stores $K_{eNB}$ [n+1] and "KI (=n+1)".

$$K_{eNB}[n+1]=KDF_1(K_{ASME}, K_{eNB}[n])$$

Furthermore, the mobile station UE calculates $K_{RRC\_IP}$, $K_{RRC\_Ciph}$ and $K_{UP\_Ciph}$ based on $K_{eNB}$ [n+1] and uses them in subsequent AS communications.

In step S1011, the mobile station UE transmits "RRC HO Complete (handover complete signal)" to the handover target radio base station (Target eNB).

In step S1012, the handover target radio base station (Target eNB) transmits "S1 Path Switch (path switch signal)" including "KI (=n+1)" to the switching center MME.

In step S1013, the switching center MME calculates $K_{eNB}$ [n+2] from the formula given below, and in step S1014, stores $K_{eNB}$ [n+2] and "KI (=n+1)".

$$K_{eNB}[n+2]=KDF_1(K_{ASME},K_{eNB}[n+1])$$

In step S1015, the switching center MME transmits "S1 Patch Switch Ack (path switch acknowledge signal)" including $K_{eNB}$ [n+2] and "KI (=n+1)" to the handover target radio base station (Target eNB).

In step S1016, the handover target radio base station (Target eNB) stores $K_{eNB}$ [n+1], $K_{eNB}$ [n+2] and "KI (=n+1)".

Through the above procedure, $K_{eNB}$ and certain keys are updated in the X2 handover.

Figure 5:
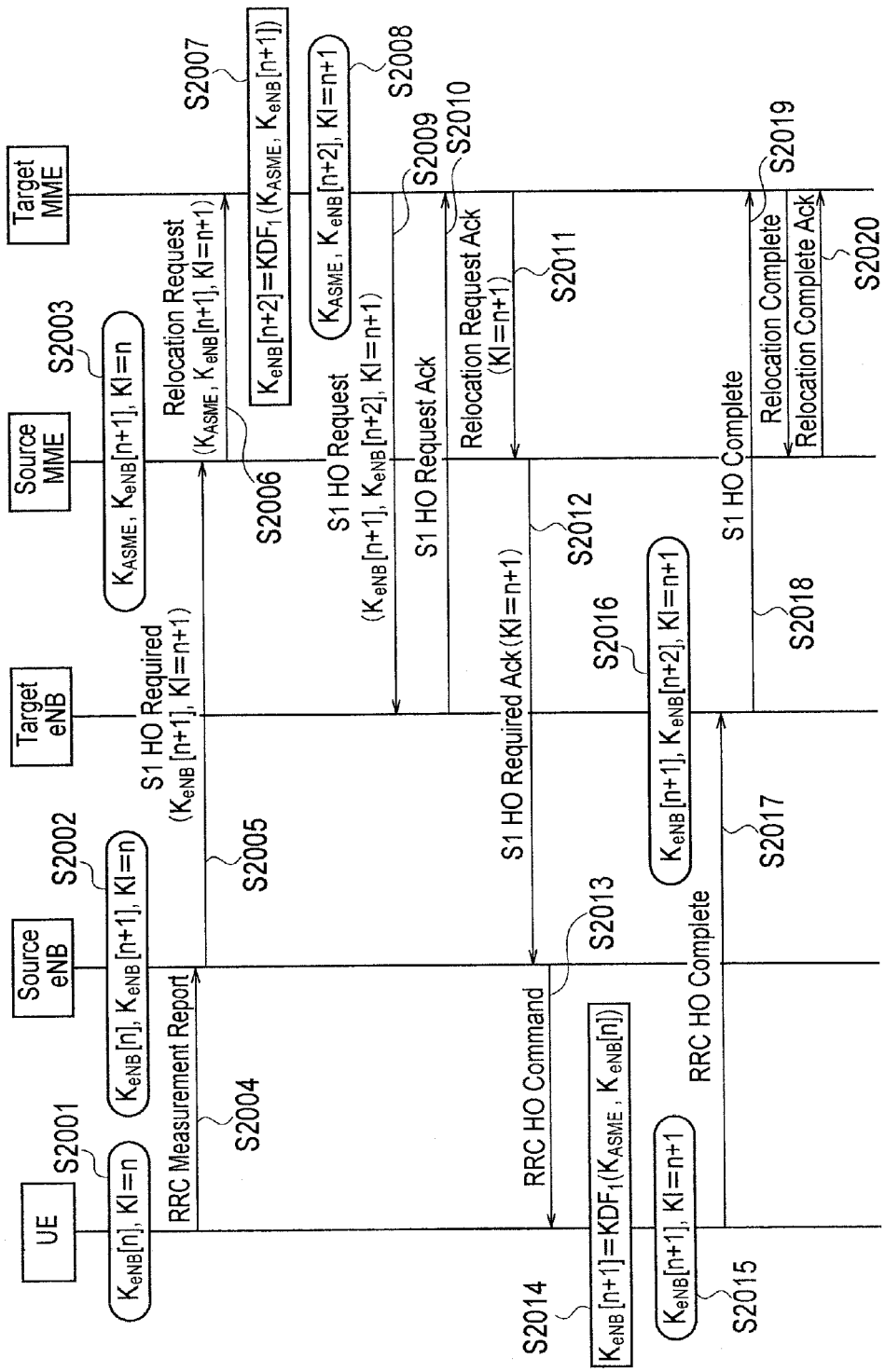
FIG. 5 is a sequence diagram showing an S1 handover procedure in the mobile communication system according to the first embodiment of the present invention.

Thirdly, an S1 handover procedure (handover procedure between different switching centers) in the mobile communication system according to this embodiment is described referring to FIG. 5.

As shown in FIG. 5, before starting the S1 handover procedure, the mobile station UE holds $K_{eNB}$ [n] and "KI (=n)" (in step S2001), the handover source radio base station (Source eNB) holds $K_{eNB}$ [n], $K_{eNB}$ [n+1] and "KI (=n)" (in step S2002), and the switching center MME holds $K_{ASME}$, $K_{eNB}$ [n+1] and "KI (=n)" (in step S2003).

In step S2004, if predetermined conditions are satisfied, the mobile station UE transmits "RRC Measurement Report (measurement report signal)" to the handover source radio base station (Source eNB).

In step S2005, the handover source radio base station (Source eNB) transmits "S1 HO Required (handover request receipt signal)" including $K_{eNB}$ [n+1] and "KI (=n+1)" to the handover source switching center (source MME).

In step S2006, the handover source switching center (Source MME) transmits "Relocation Request (relocation request signal)" including $K_{ASME}$, $K_{eNB}$ [n+1] and "KI (=n+1)" to the handover target switching center (Target MME).

In step S2007, the handover target switching center (Target MME) calculates $K_{eNB}$ [n+2] from the formula given below, and in step S2008, stores $K_{eNB}$ [n+2] and "KI (=n+1)".

$$K_{eNB}[n+2]=KDF_1(K_{ASME},K_{eNB}[n+1])$$

In step S2009, the handover target switching center (Target MME) transmits "S1 HO Request (handover request signal)" including $K_{eNB}$ [n+1], $K_{eNB}$ [n+2] and "KI (=n+1)" to the handover target radio base station (Target eNB).

In step S2010, the handover target radio base station (Target eNB) transmits "S1 HO Request Ack (handover request acknowledge signal)" to the handover target switching center (Target MME).

In step S2011, the handover target switching center (Target MME) transmits "Relocation Request Ack (relocation request acknowledge signal)" including "KI (=n+1)" to the handover source switching center (Source MME).

In step S2012, the handover source switching center (Source MME) transmits "S1 HO Required Ack (handover request receipt acknowledge signal)" including "KI (=n+1)" to the handover source radio base station (Source eNB).

In step S2013, the handover source radio base station (Source eNB) transmits "RRC HO Command (handover command signal)" to the mobile station UE.

In step S2014, the mobile station UE calculates $K_{eNB}$ [n+1] from the following formula, and in step S2015, stores $K_{eNB}$ [n+1] and "KI (=n+1)".

$$K_{eNB}[n+1]=KDF_1(K_{ASME},K_{eNB}[n])$$

Furthermore, the mobile station UE calculates $K_{RRC\_IP}$, $K_{RRC\_Ciph}$ and $K_{UP\_Ciph}$ on the basis of $K_{eNB}$ [n+1] and uses them in subsequent AS communications.

At this stage, the handover target radio base station (Target eNB) holds $K_{eNB}$ [n+1], $K_{eNB}$ [n+2] and "KI (=n+1)" (in step S2016). The radio base station eNB calculates $K_{RRC\_IP}$, $K_{RRC\_Ciph}$ and $K_{UP\_Ciph}$ based on $K_{eNB}$ [n+1], and uses them in subsequent AS communications.

In step S2017, the mobile station UE transmits "RRC HO Complete (handover complete signal)" to the handover target radio base station (Target eNB).

In step S2018, the handover target radio base station (Target eNB) transmits "S1 HO Complete (handover complete signal)" to the handover target switching center (Target MME).

In step S2019, the handover target switching center (Target MME) transmits "Relocation Complete (relocation complete signal)" to the handover source switching center (Source MME), and in step S2020, the handover source switching center (Source MME) transmits "Relocation Complete Ack (relocation complete acknowledge signal)" to the handover target switching center (Target MME).

Through the above procedure, $K_{eNB}$ and certain keys are updated in the S1 handover.

Operations of the mobile station UE in the S1 handover procedure are same as operations in the X2 handover procedure shown in FIG. 3. Based on the same processing, the mobile station UE is capable of performing both X2 and S1 handover procedures. That is, the mobile station UE is capable of performing a handover regardless of whether the handover type is "X2 handover" or "S1 handover".

Figure 6:
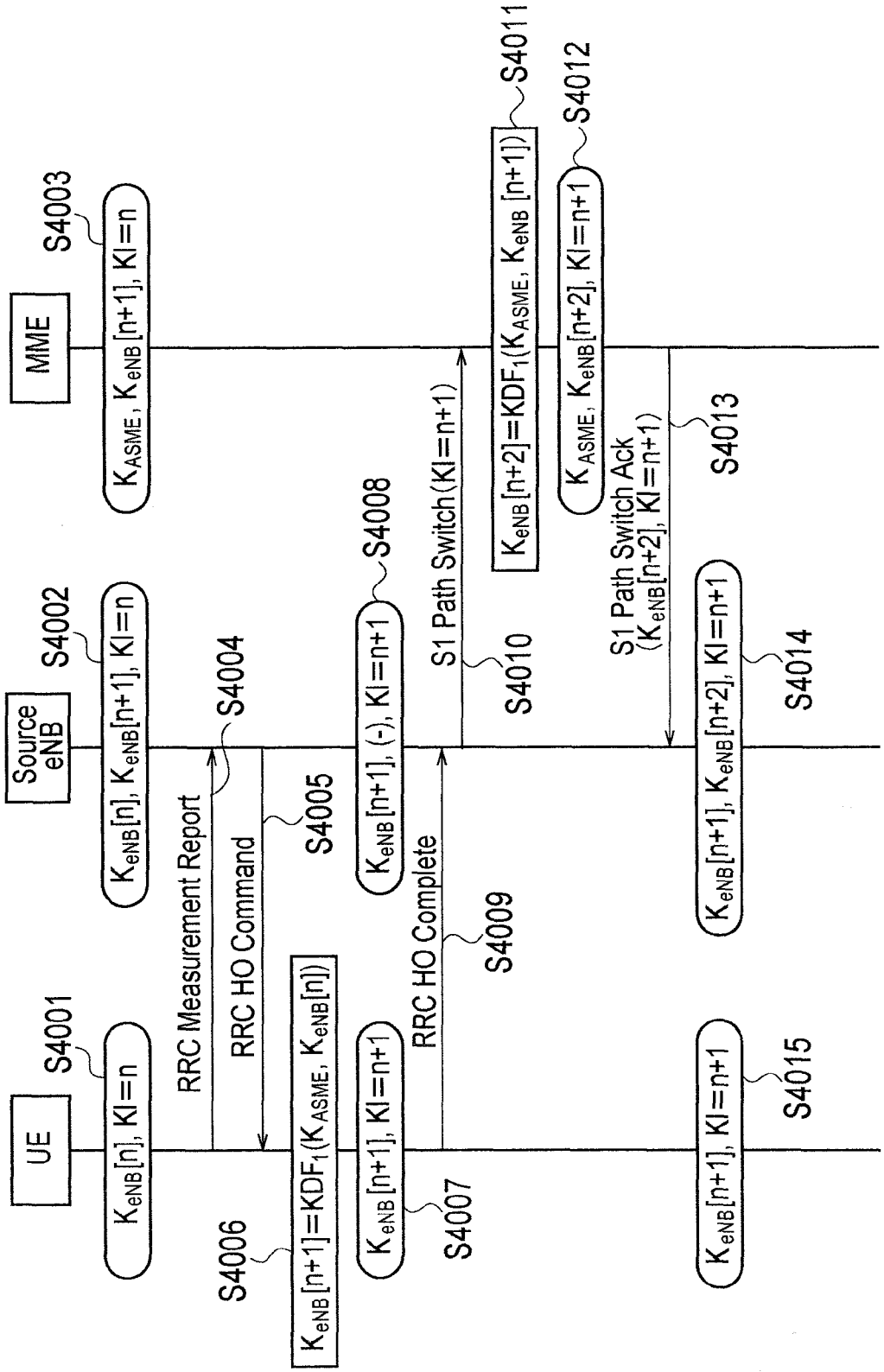
FIG. 6 is a sequence diagram showing an Intra-eNB handover procedure in the mobile communication system according to the first embodiment of the present invention.

Fourthly, an Intra-eNB handover procedure (inter-radio base station handover procedure) in the mobile communication system according to this embodiment is described referring to FIG. 6.

As shown in FIG. 6, before starting the Intra-eNB handover procedure, the mobile station UE holds $K_{eNB}$ [n] and "KI (=n)" (in step S4001), the radio base station (Source eNB) holds $K_{eNB}$ [n], $K_{eNB}$ [n+1.] and "KI (=n)" (in step S4002), and the switching center MME holds $K_{ASME}$, $K_{eNB}$ [n+1] and "KI (=n)" (in step S4003).

In step S4004, if predetermined conditions are satisfied, the mobile station UE transmits "RRC Measurement Report (measurement report signal)" to the radio base station (Source eNB).

In step S4005, the radio base station (Source eNB) transmits "RRC HO Command (handover command signal)" to the mobile station UE.

In step S4006, the mobile station UE calculates $K_{eNB}$ [n+1] from the formula given below, and in step S4007, stores $K_{eNB}$ [n+1] and "KI (=n+1)".

$$K_{eNB}[n+1]=KDF_1(K_{ASME},K_{eNB}[n])$$

Furthermore, the mobile station UE calculates $K_{RRC\_IP}$, $K_{RRC\_Ciph}$ and $K_{UP\_Ciph}$ based on $K_{eNB}$ [n+1] and uses them in subsequent AS communications.

At this stage, the radio base station (Source eNB) holds $K_{eNB}$ [n+1] and "KI (=n+1)" (in step S4008). The radio base station eNB calculates $K_{RRC\_IP}$, $K_{RRC\_Ciph}$ and $K_{UP\_Ciph}$ based on $K_{eNB}$ [n+1] and uses them in subsequent AS communications.

In step S4009, the mobile station UE transmits "RRC HO Complete (handover complete signal)" to the radio base station (Source eNB).

In step S4010, the radio base station (Source eNB) transmits "S1 Path Switch (path switch signal)" including "KI (=n+1)" to the switching center MME.

In step S4011, the switching center MME calculates $K_{eNB}$ [n+2] from the formula given below, and in step S4012, stores $K_{ASME}$, $K_{eNB}$ [n+2] and "KI (=n+1)".

$$K_{eNB}[n+2]=KDF_1(K_{ASME},K_{eNB}[n+1])$$

In step S4013, the switching center MME transmits "S1 Path Switch Ack (path switch acknowledge signal)" including $K_{eNB}$ [n+2] and "KI (=n+1)" to the radio base station (Source eNB).

In step S4014, the radio base station (Source eNB) stores $K_{eNB}$ [n+1] $K_{eNB}$ [n+2] and "KI (=n+1)". At this stage, the mobile station UE holds $K_{eNB}$ [n+1] and "KI (=n+1)" (in step S4015).

Through the above procedure, $K_{eNB}$ and certain keys are updated in the Intra-NB handover.

Operations of the mobile station UE in the Intra-eNB handover procedure are same as operations in the X2 handover procedure shown in FIG. 3 and in the S1 handover procedure shown in FIG. 4. Based on the same processing, the mobile station UE is capable of performing all of X2, S1 and Intra-eNB handover procedures. That is, the mobile station UE is capable of performing a handover with regardless of whether the handover type is "X2 handover", "S1 handover" or "Intra-eNB handover"

(Advantageous Effects of Mobile Communication System According to First Embodiment of the Present Invention)

In the mobile communication system according to the first embodiment of the present invention, $K_{eNB}$ [n+1] and the like used in the handover target radio base station (Target eNB) can be generated through a simplified procedure.

Furthermore, in the mobile communication system according to the first embodiment of the present invention, there is no need to change operations of the mobile station UE in a handover procedure regardless of the handover type (X2 handover, S1 handover or Intra-eNB handover).

(Mobile Communication System According to Second Embodiment of the Present Invention)

Figure 7:
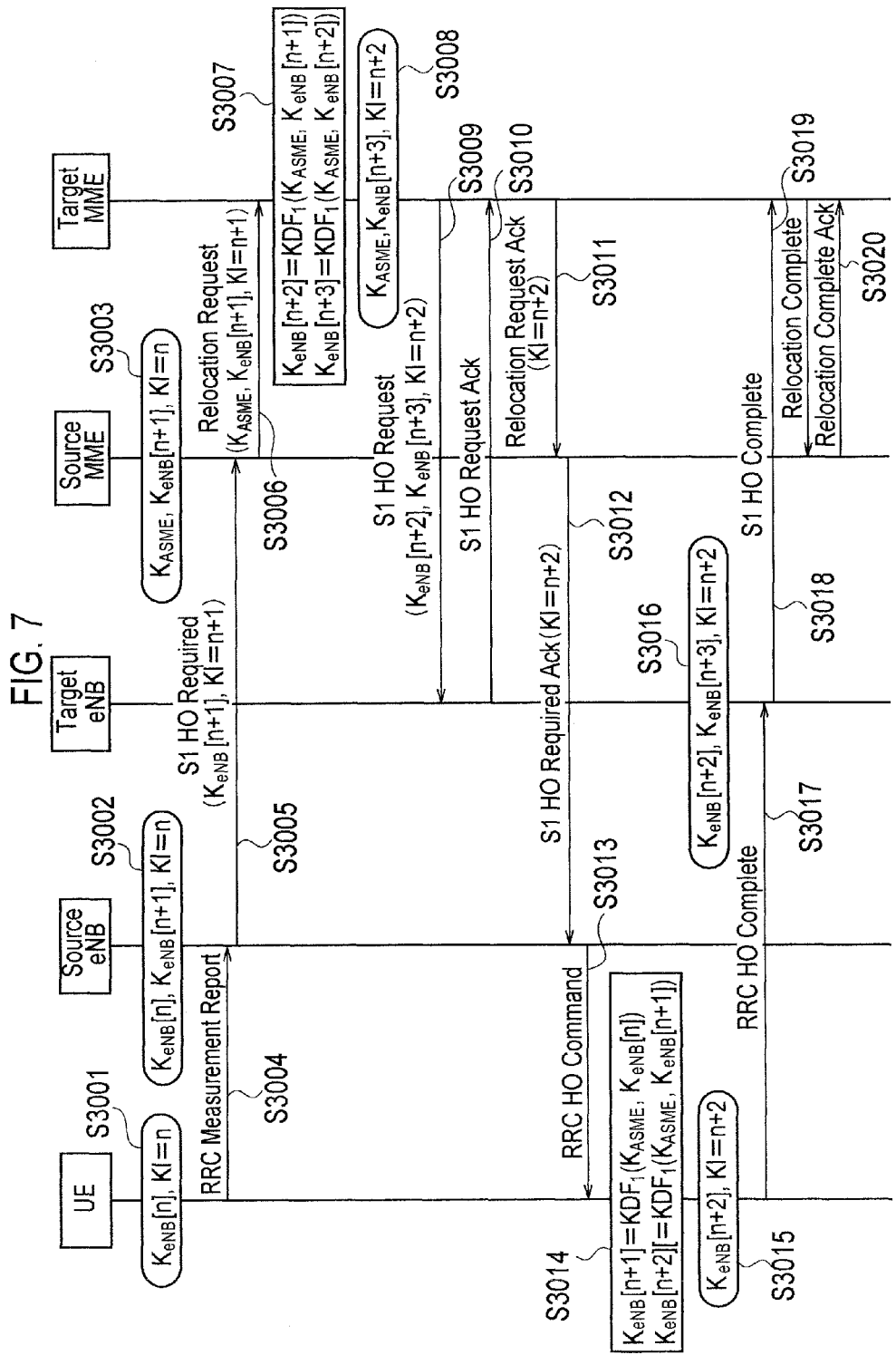
FIG. 7 is a sequence diagram showing an S1 handover procedure in a mobile communication system according to a second embodiment of the present invention.

Referring to FIG. 7, a mobile communication system according to a second embodiment of the present invention is described by focusing on differences from the above described mobile communication system according to the first embodiment of the present invention.

Specifically, the S1 handover procedure (handover procedure between different switching centers) in the mobile communication system according to this embodiment is described referring to FIG. 7.

As shown in FIG. 7, operations in step S3001 to step S3006 are same as operations in step S2001 to step S2006 shown in FIG. 5.

In step S3007, the handover target switching center (Target MME) calculates $K_{eNB}$ [n+3] from the formulas given below, and in step S3008, stores $K_{eNB}$ [n+3] and "KI (=n+2)".

$$K_{eNB}[n+2]=KDF_1(K_{ASME},K_{eNB}[n+1])$$

$$K_{eNB}[n+3]=KDF_1(K_{ASME},K_{eNB}[n+2])$$

In step S3009, the handover target switching center (Target MME) transmits "S1 HO Request (handover request signal)" including $K_{eNB}$ [n+2], $K_{eNB}$ [n+3] and "KI (=n+2)" to the handover target radio base station (Target eNB).

In step S3010, the handover target radio base station (Target eNB) transmits "S1 HO Request Ack (handover request acknowledge signal)" to the handover target switching center (Target MME).

In step S3011, the handover target switching center (Target MME) transmits "Relocation Request Ack (relocation request acknowledge signal)" including "KI (=n+2)" to the handover source switching center (Source MME).

In step S3012, the handover source switching center (Source MME) transmits "S1 HO Required Ack (handover request receipt acknowledge signal)" including "KI (=n+2)" to the handover source radio base station (Source eNB).

In step S3013, the handover source radio base station (Source eNB) transmits "RRC HO Command (handover command signal)" to the mobile station UE. This message may include information indicating "KI (=n+2)".

In step S3014, the mobile station UE calculates $K_{eNB}$ [n+2] from the formulas given below, and in step S3015, stores $K_{eNB}$ [n+2] and "KI (=n+2)".

$$K_{eNB}[n+1]=KDF_1(K_{ASME},K_{eNB}[n])$$

$$K_{eNB}[n+2]=KDF_1(K_{ASME},K_{eNB}[n+1])$$

Furthermore, the mobile station UE calculates $K_{RRC\_IP}$ $K_{RRC\_Ciph}$ and $K_{UP\_Ciph}$ based on $K_{eNB}$ [n+2] and uses them in subsequent AS communications.

At this stage, the handover target radio base station (Target eNB) holds $K_{eNB}$ [n+2], $K_{eNB}$ [n+3] and "KI (=n+1)" (in step S3016). The radio base station eNB calculates $K_{RRC\_IP}$ $K_{RRC\_Ciph}$ and $K_{UP\_Ciph}$ based on $K_{eNB}$ [n+2] and uses them in subsequent AS communications.

Hereafter, operations in step S3017 to step S3020 are same as operations in step S2017 to step S2020 shown in FIG. 5.

Through the above procedure, certain keys and $K_{eNB}$ used in the AS communication in the handover target radio base station (Target eNB) becomes unidentifiable to the handover source radio base station (Source eNB), whereby system's security is improved.

(Mobile Communication System According to Third Embodiment of the Present Invention)

Referring to FIG. 8 to FIG. 11, a mobile communication system according to a third embodiment of the present invention is described by focusing on differences from the above described mobile communication system according to the first embodiment of the present invention.

Figure 8:
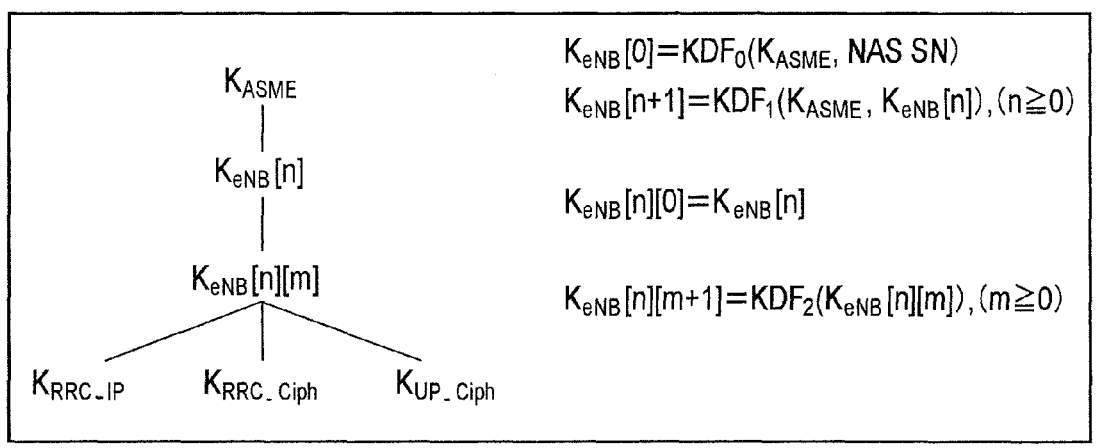
FIG. 8 is a diagram showing an exemplary hierarchical structure and calculation procedure of keys used in a mobile communication system according to a third embodiment of the present invention.

FIG. 8 shows an example of the hierarchical structure and the calculation procedure of a key used in the mobile communication system according to this embodiment (that is, a key used to calculate the certain key).

As shown in FIG. 8, a key $K_{RRC\_IP}$ used for "Integrity Protection" in the RRC protocol, a key $K_{RRC\_Ciph}$ used for "Ciphering" in the RRC protocol, and a key $K_{UP\_Ciph}$ used for "Ciphering" in the U-plane of AS are generated using $K_{eNB\ [n]\ [m]}$.

$K_{eNB}$ [n] [m] is calculated by using $K_{eNB}$ [n] from the formulas given below.

$$K_{eNB}[n][0]=K_{eNB}[n]$$

$$K_{eNB}[n][m+1]=KDF_2(K_{eNB}[n][m])(m\geq 0)$$

Furthermore, $K_{eNB}$ [n] is calculated from the formulas given below using $K_{ASME}$.

$$K_{eNB}[0]=KDF_0(K_{ASME},NAS\ SN)$$

$$K_{eNB}[n+1]=KDF_1(K_{ASME},K_{eNB}[n]),(n\geq 0)$$

Figure 9:
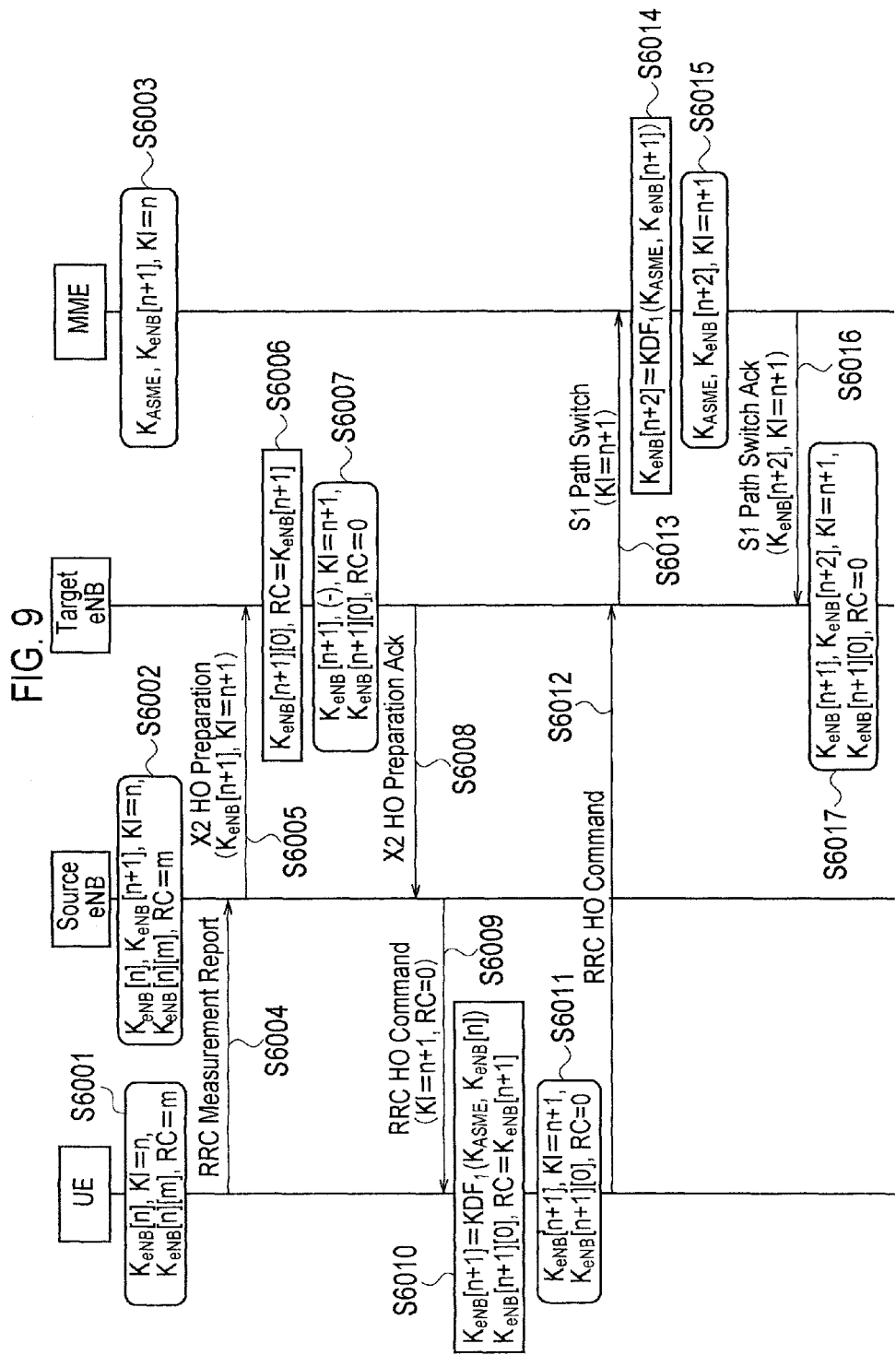
FIG. 9 is a sequence diagram showing an X2 handover procedure in the mobile communication system according to the third embodiment of the present invention.
Figure 10:
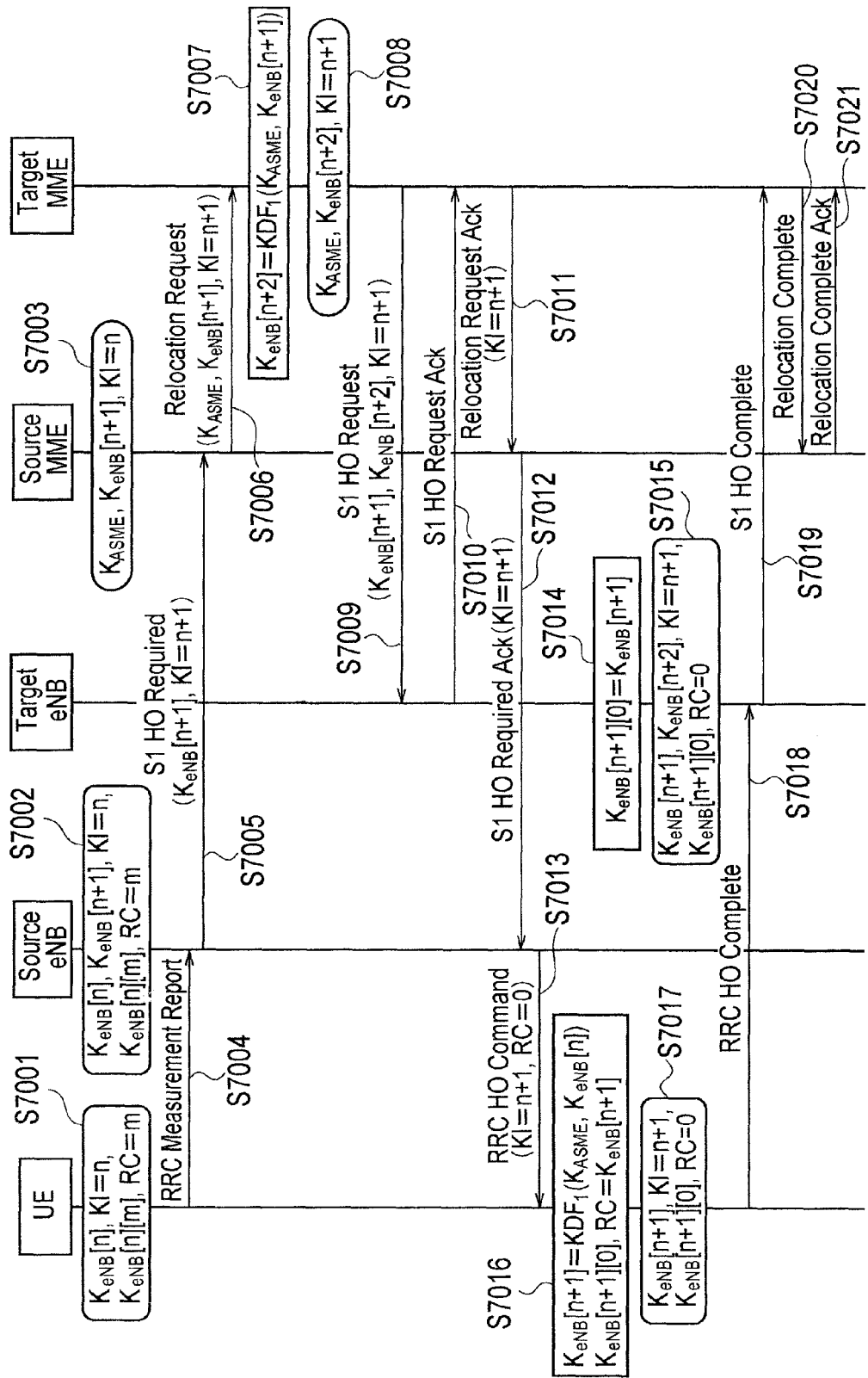
FIG. 10 is a sequence diagram showing an S1 handover procedure in the mobile communication system according to the third embodiment of the present invention.
Figure 11:
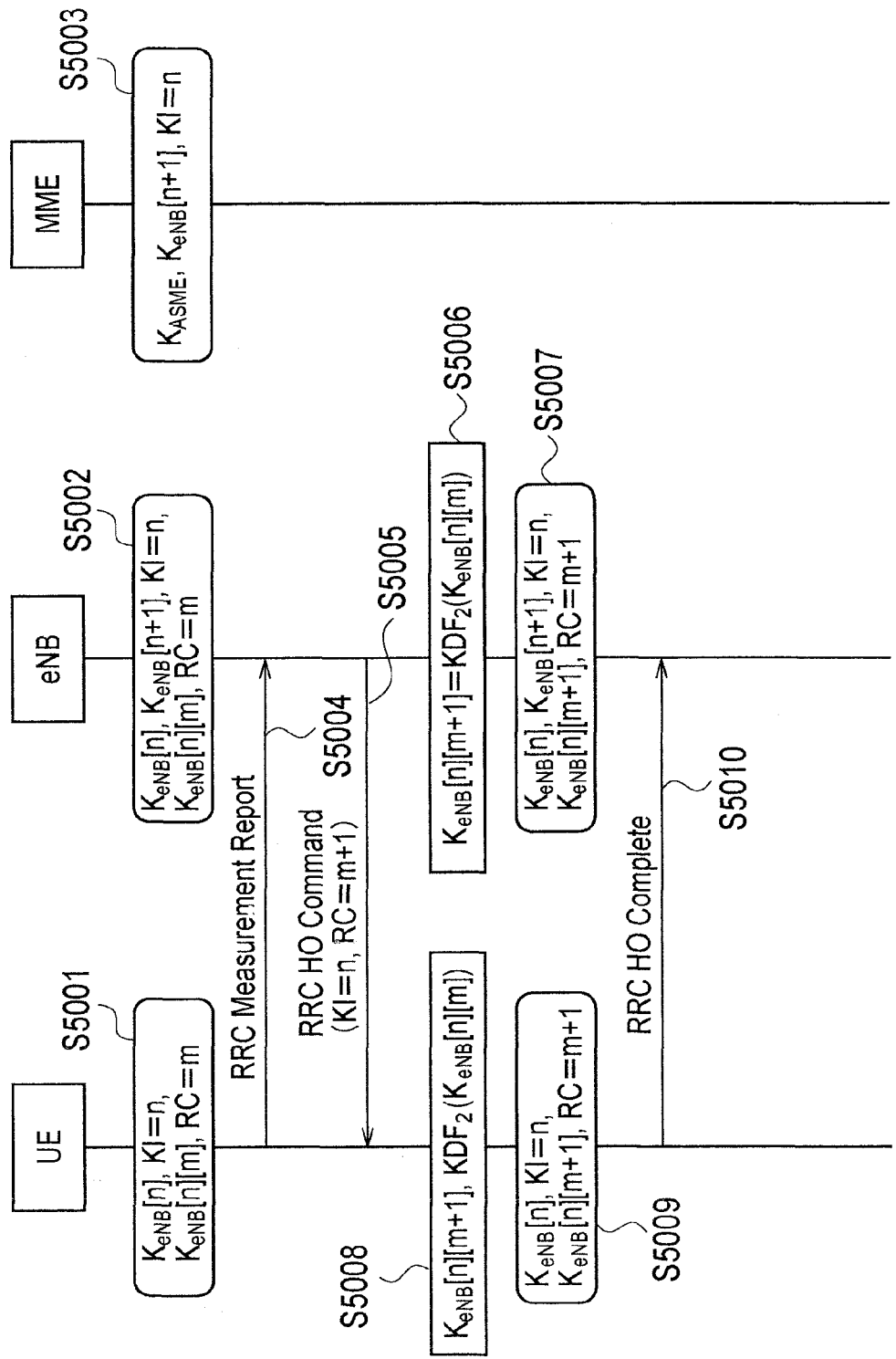
FIG. 11 is a sequence diagram showing an Intra-eNB handover procedure in the mobile communication system according to the third embodiment of the present invention.
Figure 12:
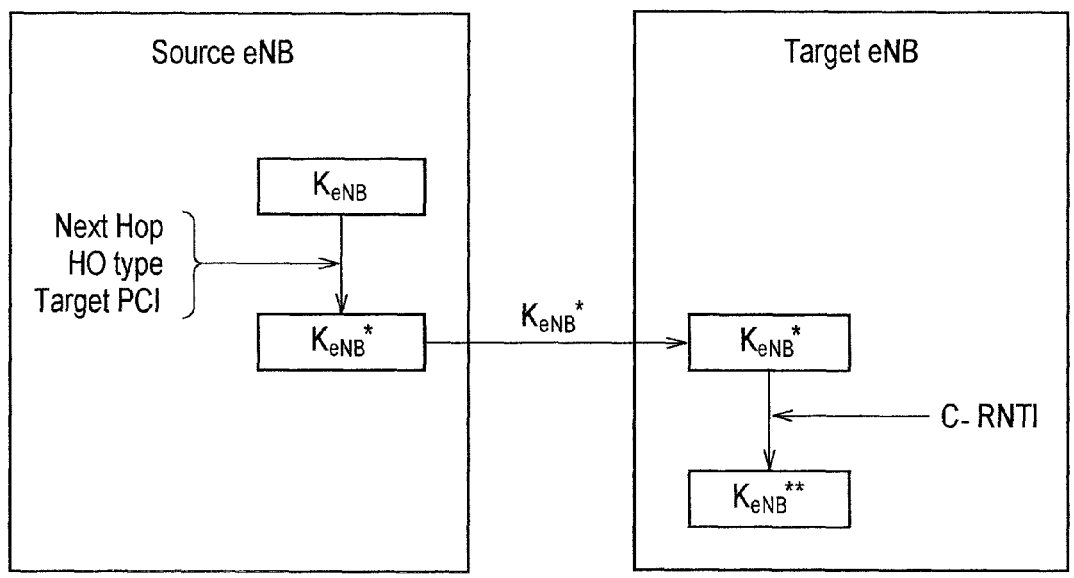
FIG. 12 is a diagram showing an exemplary calculation procedure of keys used in a mobile communication system according to a conventional technique.

Hereafter, operations of the mobile communication system according to this embodiment are described referring to FIG. 9 to FIG. 11.

Firstly, an X2 handover procedure (handover procedure between different radio base stations) in the mobile communication system according to this embodiment is described referring to FIG. 9.

As shown in FIG. 9, before starting the X2 handover procedure, the mobile station UE holds $K_{eNB}$ [n] $K_{eNB}$ [n] [m], "KI (=n)" and "RC (=m)" (in step S6001), the handover source radio base station (Source eNB) holds $K_{eNB}$ [n], $K_{eNB}$ [n+1], $K_{eNB}$ [n] [m], "KI (=n)" and "RC (=m)" (in step S6002), and the switching center MME holds $K_{ASME}$, $K_{eNB}$ [n+1] and "KI (=n)" (in step S6003).

In step S6004, if predetermined conditions are satisfied, the mobile station UE transmits "RRC Measurement Report (measurement report signal)" to the handover source radio base station (Source eNB).

In step S6005, the handover source radio base station (Source eNB) transmits "X2 HO Preparation (handover preparation signal)" including $K_{eNB}$ [n+1] and "KI (=n+1)" to the handover target radio base station (Target eNB).

In steps S6006 and S6007, the handover target radio base station (Target eNB) stores $K_{eNB}$ [n+1] $K_{eNB}$ [n+1] [0], "KI (=n+1)" and "RC (=0)". Here, it is assumed that $K_{eNB}$ [n+1] [0]=$K_{eNB}$ [n+1].

In step S6008, the handover target radio base station (Target eNB) transmits "X2 HO preparation Ack (handover preparation acknowledge signal)" to the handover source radio base station (Source eNB).

In step S6009, the handover source radio base station (Source eNB) transmits "RRC HO Command (handover command signal)" including "KI (=n+1)" and "RC (=0)" to the mobile station UE.

In step S6010, the mobile station UE calculates $K_{eNB}$ [n+1.] and $K_{eNB}$ [n+1] [0] from the formulas given below, and in step S6011, stores $K_{eNB}$ [n+1], $K_{eNB}$ [n+1] [0], "KI (=n+1)" and "RC (=0)".

$$K_{eNB}[n+1]=KDF_1(K_{ASME},K_{eNB}[n])$$

$$K_{eNB}[n+1][0]=K_{eNB}[n+1]$$

Furthermore, the mobile station UE calculates $K_{RRC\_IP}$, $K_{RRC\_Ciph}$ and $K_{UP\_Ciph}$ based on $K_{eNB}$ [n+1] [0] and uses them in subsequent AS communications.

Hereafter, operations in step S6012 to step S6017 are same as operations in step S1011 to step S1016 shown in FIG. 4.

Secondly, an S1 handover procedure (handover procedure between different switching centers) in the mobile communication system according to this embodiment is described referring to FIG. 10.

As shown in FIG. 10, before starting the S1 handover procedure, the mobile station UE holds $K_{eNB}$ [n], $K_{eNB}$ [n] [m], "KI (=n)" and "RC (=m)" (in step S7001), the handover source radio base station (Source eNB) holds $K_{eNB}$ [n] $K_{eNB}$ [n+1], $K_{eNB}$ [n] [m], "KI (=n)" and "RC (=m)" (in step S7002), and the switching center MME holds $K_{ASME}$, $K_{eNB}$ [n+1] and "KI (=n)" (in step S7003).

Hereafter, operations in step S7004 to step S7012 are same as operations in step S2004 to step S2012 shown in FIG. 4.

In step S7013, the handover source radio base station (Source eNB) transmits "RRC HO Command (handover command signal)" including "KI (=n+1)" and "RC (=0)" to the mobile station UE.

Here, in step S7014, the handover target radio base station (Target eNB) calculates $K_{eNB}$ [n+1] [0] from the formula given below and stores it.

$$K_{eNB[n+1][0]}=K_{eNB[n+1]}$$

At this stage, it is assumed that the handover target radio base station (Target eNB) stores $K_{eNB}$ [n+1] $K_{eNB}$ [n+2] $K_{eNB}$ [n+1] [0], "KI (=n+1)", and "RC (=0)" (in step S7015). The radio base station eNB calculates $K_{RRC\_IP}$ $K_{RRC\_Ciph}$ and $K_{UP\_Ciph}$ based on $K_{eNB}$ [n+1] [0] and uses them in subsequent AS communications.

In step S7016, the mobile station UE calculates $K_{eNB}$ [n+1] and $K_{eNB}$ [n+1] [0] from the formulas given below, and in step S7017, stores $K_{eNB}$ [n+1], $K_{eNB}$ [n+1] [0], "KI (=n+1)" and "RC (=0)"

$$K_{eNB}[n+1]=KDF_1(K_{ASME},K_{eNB}[n])$$

$$K_{eNB}[n+1][0]=K_{eNB}[n+1]$$

Furthermore, the mobile station UE calculates $K_{RRC\_IP}$, $K_{RRC\_Ciph}$ and $K_{UP\_Ciph}$ based on $K_{eNB}$ [n+1] [0] and uses them to subsequent AS communications.

Hereafter, operations in step S7018 to step S7021 are same as operations in step S2017 to step S2020 shown in FIG. 5.

Thirdly, an Intra-eNB handover procedure (inter-radio base station handover procedure) in the mobile communication system according to this embodiment is described referring to FIG. 11.

As shown in FIG. 11, before starting the Intra-eNB handover procedure, the mobile station UE holds $K_{eNB}$ [n], $K_{eNB}$ [n] [m], "KI (=n)" and "RC (=m)" (in step S5001), the radio base station (Source eNB) holds $K_{eNB}$ [n], $K_{eNB}$ [n+1], $K_{eNB}$ [n] [m], "KI (=n)" and "RC (=m)" (in step S5002), and the switching center MME holds $K_{ASME}$, $K_{eNB}$ [n+1] and "KI (=n)" (in step S5003).

In step S5004, if predetermined conditions are satisfied, the mobile station UE transmits "RRC Measurement Report (measurement report signal)" to the radio base station (Source eNB).

In step S5005, the radio base station (Source eNB) transmits "RRC HO Command (handover command signal)" including "KI (=n)" and "RC (=m+1)" to the mobile station UE.

In step S5006, the radio base station (Source eNB) calculates $K_{eNB}$ [n] [m+1] from the formula given below, and in step S5007, stores $K_{eNB}$, [n], $K_{eNB}$ [n+1], $K_{eNB}$ [n] [m+1], "KI (=n+1)" and "RC (=m+1)".

$$K_{eNB}[n][m+1]=KDF_2(K_{eNB}[n][m])$$

Furthermore, the radio base station eNB calculates $K_{RRC\_IP}$, $K_{RRC\_Ciph}$ and $K_{UP\_Ciph}$ based on $K_{eNB}$ [n] [m+1] and uses them to subsequent AS communications.

At the same time, in step S5008, the mobile station UE calculates $K_{eNB}$ [n] [m+1] from the formula given below, and in step S5009, stores $K_{eNB}$ [n], $K_{eNB}$ [n] [m+1], "KI (=n+1)" and "RC (=m+1)".

$$K_{eNB}[n][m+1]=KDF_2(K_{eNB}[n][m])$$

Furthermore, the mobile station UE calculates $K_{RRC\_IP}$, $K_{RRC\_Ciph}$ and $K_{UP\_Ciph}$ based on $K_{eNB}$ [n] [m+1] and uses them in subsequent AS communications.

In step S5010, if predetermined conditions are satisfied, the mobile station UE transmits "RRC HO Complete (handover complete signal)" to the radio base station (Source eNB).

According to this embodiment, "Path Switch" in the Intra-eNB handover procedure can be omitted.

As shown in FIG. 9 to FIG. 11, by introducing $K_{eNB}$ updating in the radio base station using the parameter "RC", $K_{eNB}$ can be updated while omitting an inquiry to the switching center MME.

Meanwhile, in the procedures shown in FIG. 9 to FIG. 11, the parameter "RC" may be omitted from "RRC HO Command (handover command signal)".

When the parameter "RC" is omitted from "RRC HO Command (handover command signal)", necessity of incrementing "RC" can be determined by determining whether the parameter "KI" has been incremented or not.

If the "KI" has been incremented, "RC" may be reset to "0", whereas if the "KI" has not been incremented, "RC" may be incremented.

Alternatively, if the parameter "RC" is omitted from "RRC HO Command (handover command signal)", the mobile station UE may, on a trial basis, maintain the present value of "RC", increment "RC" or reset "RC" to "0" and then check "Integrity" with respect to a message received for each of the cases to autonomously determine which one of the cases is correct.

Note that operation of the above described switching center MME, the radio base station eNB and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the switching center MME, the radio base station eNB and the mobile station UE. Also, the storage medium and the processor may be provided in the switching center MME, the radio base station eNB and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in which a mobile station performs a handover from a handover source radio base station to a handover target radio base station via an inter-radio base station interface, the mobile communication method comprising the steps of:

(A) acquiring, at the handover target radio base station, from the handover source radio base station, a first key for generating a certain key used in a communication between the handover target radio base station and the mobile station;

(B) acquiring, at the handover target radio base station, from the switching center, a second key for generating a certain key used in a communication between a next handover target radio base station and the mobile station; and (C) updating, at the mobile station, upon receiving a handover command signal from the handover source radio base station, a first key for generating a certain key used in a communication between the handover source radio base station and the mobile station, to the first key for generating the certain key used in the communication between the handover target radio base station and the mobile station, wherein, in step (C), the mobile station updates the first key for generating the certain key used in the communication between the handover source radio base station and the mobile station, to the first key for generating the certain key used in the communication between the handover target radio base station and the mobile station, based on a parameter included in the handover command signal, and wherein step (C) further comprises the steps of:

(C1) generating, at the mobile station, the first key for generating the certain key used in the communication between the handover target radio base station and the mobile station based on the parameter included in the handover command signal, when the parameter is incremented; and (C2) generating, at the mobile station, the first key for generating the certain key used in the communication between the handover target radio base station and the mobile station based on the first key for generating the certain key used in the communication between the handover source radio base station and the mobile station, when the parameter included in the handover command signal is not incremented.

2. The mobile communication method according to claim 1, wherein in the step (C1), when the parameter included in the handover command signal is incremented, the mobile station updates, based on the parameter, a second key for generating the certain key used in the communication between the handover target radio base station and the mobile station, and generates the first key for generating the certain key used in the communication between the handover target radio base station and the mobile station based on the updated second key.

3. The mobile communication method according to claim 2 further comprising the step of:

(D) storing, at the mobile station, the received parameter.

4. The mobile communication method according to claim 2, wherein the parameter is KI.

5. The mobile communication method according to claim 2, wherein the parameter included in the handover command signal is a parameter which is incremented or not.

6. The mobile communication method according to claim 1, wherein the parameter is KI.

7. The mobile communication method according to claim 6 further comprising the step of:

(D) storing, at the mobile station, the received parameter.

8. The mobile communication method according to claim 1 further comprising the step of:

(D) storing, at the mobile station, the received parameter.

9. The mobile communication method according to claim 1, wherein the parameter included in the handover command signal is a parameter which is incremented or not.

10. A mobile station which performs a handover from a handover source radio base station to a handover target radio base station, the mobile station comprising:

a key updating unit configured to update, upon receiving a handover command signal from the handover source radio base station, a first key for generating a certain key used in a communication between the handover source radio base station and the mobile station, to a first key for generating a certain key used in a communication between the handover target radio base station and the mobile station, wherein the key updating unit is configured to update, based on a parameter included in the handover command signal, the first key for generating the certain key used in the communication between the handover source radio base station and the mobile station, to the first key for generating the certain key used in the communication between the handover target radio base and the mobile station, wherein the key updating unit is configured to generate, when the parameter included in the handover command signal is incremented, the first key for generating the certain key used in the communication between the handover target radio base station and the mobile station, based on the parameter, and wherein the key updating unit is configured to generate, when the parameter included in the handover command signal is not incremented, the first key for generating the certain key used in the communication between the handover target radio base station and the mobile station, based on the first key for generating the certain key used in the communication between the handover source radio base station and the mobile station.

11. The mobile station according to claim 10, wherein the key updating unit is configured to update, when a parameter included in the handover command signal is incremented, a second key for generating the certain key used in the communication between the handover target radio base station and the mobile station, based on the parameter, and to generate the first key for generating certain keys used in the communication between the handover target radio base station and the mobile station, based on the updated second key.

12. The mobile station according to claim 11, wherein the parameter is KI.

13. The mobile station according to claim 12, wherein the key updating unit is configured to store the received parameter.

14. The mobile station according to claim 11, wherein the key updating unit is configured to store the received parameter.

15. The mobile station according to claim 10, wherein the parameter is KI.

16. The mobile station according to claim 15, wherein the key updating unit is configured to store the received parameter.

17. The mobile station according to claim 10, wherein the key updating unit is configured to store the received parameter.

* * * * *